United States Patent
Peiffer et al.

(12)

(10) Patent No.: US 6,517,932 B1
(45) Date of Patent: Feb. 11, 2003

(54) STERILIZABLE FILM COMPOSITE FOR PACKAGING PURPOSES

(75) Inventors: Herbert Peiffer, Mainz (DE); Wolfgang Lohwasser, Gailingen (DE); Richard Lee Davis, Wiesbaden (DE); Olaf Frei, Siblingen (CH)

(73) Assignees: Alusuisse Technology & Management AG (CH); Mitsubishi Polyester Film GmbH (DE)

( * ) Notice: Subject to any disclaimer, the term of this patent is extended or adjusted under 35 U.S.C. 154(b) by 0 days.

(21) Appl. No.: 09/857,248

(22) PCT Filed: Dec. 3, 1999

(86) PCT No.: PCT/EP99/09438

§ 371 (c)(1),
(2), (4) Date: Aug. 10, 2001

(87) PCT Pub. No.: WO00/34037

PCT Pub. Date: Jun. 15, 2000

(30) Foreign Application Priority Data

Dec. 8, 1998 (EP) .............................................. 98811205

(51) Int. Cl.⁷ ........................... B32B 7/02; B32B 27/36; B65D 65/40
(52) U.S. Cl. ............. 428/216; 427/255.31; 427/255.37; 428/215; 428/334; 428/335; 428/336; 428/451; 428/480
(58) Field of Search ................................ 428/215, 216, 428/334, 335, 336, 451, 480; 427/255.31, 255.37

(56) References Cited

U.S. PATENT DOCUMENTS

| 5,670,224 A | 9/1997 | Izu et al. .................... 428/35.8 |
| 5,830,545 A | 11/1998 | Frisk .......................... 428/34.7 |

FOREIGN PATENT DOCUMENTS

| EP | 0 484 275 A1 | 10/1991 |
| EP | 0 878 298 A2 * | 11/1998 |
| JP | 5128488 | 5/1993 |

* cited by examiner

*Primary Examiner*—D. S. Nakarani
(74) *Attorney, Agent, or Firm*—ProPat, L.L.C.

(57) ABSTRACT

The invention relates to a film composite for packaging purposes. Said film composite efficiently blocks the passage of water vapor and gas after sterilization in a water bath or in water vapor at temperatures of more than 90° C., and comprises a film consisting of polyethylene terephthalate (PET) with a coextruded layer consisting of polyethylene-2,6-naphthalate (PEN) on at least one side. The film has a 10 nm to 200 nm thick ceramic layer on at least one of the sides that are coated with PEN, said layer being produced by vaporizing aluminium while supplying oxygen or by vaporizing silicon monoxide (SiO), optionally while supplying oxygen, in a vacuum. The layer consists of $Al_2O_3$ or $SiO_x$, x being a number between 0.9 and 2. The composite film blocks the passage of water vapor and gases to a large extent after sterilization in a water bath or in water vapor at temperatures of more than 90° C.

6 Claims, No Drawings

STERILIZABLE FILM COMPOSITE FOR PACKAGING PURPOSES

The invention relates to a film composite for packaging purposes, effectively blocking the passage of water vapor and gases after sterilization in a water bath or in water vapor at temperatures of more than 90° C., where the film composite has a barrier layer produced by vapor-deposition of inorganic materials. The scope of the invention also covers a process for producing the film composite, and its use.

BACKGROUND OF THE INVENTION

In a known process for extending the shelf life of perishable products, for example food and drink, a sterilization process is carried out on the packaged product. For this, the contents, within their sealed packaging, are heated for a short time in an autoclave in hot water or water vapor at temperatures of up to about 130° C.

The water vapor barrier, oxygen barrier or flavor barrier of the transparent film composite currently known and used for the packaging of food or drink is frequently insufficient after sterilizing treatment. An example of this is given by polymers of ethylvinyl alcohol (EVOH) and copolymers of EVOH and polyethylene (PE), which show impairment of barrier properties, in particular at high moisture level, and have a milky appearance. Coating gives better barrier properties in a film made from polyethylene terephthalate (PET) and coated with silicon monoxide, but these films show besides a yellowish discoloration in particular after sterilization at elevated temperatures a reduction in the level of barrier properties.

The object on which the invention is based is therefore to provide a film composite of the type mentioned at the outset which, compared with transparent film laminates of the prior art, has improved barrier properties in relation to water vapor, oxygen and flavors after sterilizing treatment.

SUMMARY OF THE INVENTION

The invention achieves this object by way of a film composite characterized in that the film composite encompasses a film made from polyethylene terephthalate (PET) with a coextruded layer made from polyethylene 2,6-naphthalate (PEN) on at least one side, and has a ceramic layer of from 10 to 200 nm thickness on at least one of the sides coated with PEN, said layer being produced in a vacuum from $Al_2O_3$ or from $SiO_x$, x being a number between 0.9 and 2.

DESCRIPTION OF THE INVENTION

For the purposes of the present invention, PEN is either the pure polymer or else a mixture of polymers which comprises at least 60% by weight of ethylene 2,6-naphthalate units and up to 40% by weight of ethylene terephthalate units and/or units derived from cycloaliphatic or aromatic diols and/or dicarboxylic acids.

Preference is given to a PEN layer in which the polymers contain at least 65% by weight of ethylene 2,6-naphthalate units and up to 35% by weight of ethylene terephthalate units. Particular preference is given to a PEN layer in which the polymers contain at least 70% by weight of ethylene 2,6-naphthalate units and up to 30% by weight of ethylene terephthalate units. However, as mentioned above it is also possible for the PEN layer to be composed entirely of ethylene 2,6-naphthalate polymers.

Examples of suitable aliphatic diols are diethylene glycol, triethylene glycol, aliphatic glycols of the formula HO—$(CH_2)_n$—OH, n being an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—$C_6H_4$—X—$C_6H_4$—OH, X being —$CH_2$—, —$C(CH_3)_2$—, $C(CF_3)_2$—, —O—, —S— or —$SO_2$—. Bisphenols of the formula HO—$C_6H_4$—$C_6H_4$—OH are also highly suitable.

Preferred aromatic dicarboxylic acids are benzenedicarboxylic acids, naphthalenedicarboxylic acids (such as naphthalene-1,4-dicarboxylic acid or 1,6-dicarboxylic acid), biphenyl-x,x'-dicarboxylic acids (in particular biphenyl-4, 4'-dicarboxylic acid), diphenylacethylene-x,x'-dicarboxylic acids (in particular diphenylacetylene-4,4'-dicarboxylic acid) and stilbene-x,x'-dicarboxylic acids. Among the cycloaliphatic dicarboxylic acids, mention should be made of cyclohexanedicarboxylic acids (in particular cyclohexane-1,4-dicarboxylic acid). Among the aliphatic dicarboxylic acids, the ($C_3$–$C_{19}$) alkanediacids are particularly suitable, where the alkane moiety may be straight-chain or branched.

A preferred process for producing the PEN/PET film encompasses the following steps:
 a) production of the film by coextrusion
 b) biaxial orientation of the film, and
 c) heat-setting of the oriented film.

The PEN layer may have been arranged on one or both sides of the PET film. An arrangement of the PEN layer on one side is preferred, and it is possible for another layer made from PET, and also comprising antiblocking agents, to have been arranged on that side facing away from the PEN layer.

The thickness of the PEN layer is preferably from 0.1 to 4 μm, in particular from 0.2 to 2 μm. The preferred thickness of the ceramic layer made from $Al_2O_3$ or $SiO_x$ is between about 40 and 150 nm.

The film composite finally used for packaging purposes comprises other films depending on the application alongside the PEN/PET film coated with $Al_2O_3$ or $SiO_x$, for example films made from PET or made from an oriented polyamide (oPA), or the film composite may have been coated with a sealable layer made from polypropylene (PP) or polyethylene (PE), for example, to control sealing properties. The combining of the separate films to give a film composite preferably takes place by way of laminating adhesives based on polyurethane.

One way of depositing the ceramic layers with $SiO_x$ on the PEN/PET film is to use processes from thin-layer vacuum technology, the ceramic layer always being arranged as boundary layer on that side of the film coated with PEN, and being covered by another film or, respectively, by a laminating adhesive.

Using a known vacuum thin-layer process, a ceramic layer of from 10 to 200 nm thickness made from $Al_2O_3$ or $SiO_x$, x being a number between 0.9 and 2, is deposited in a vacuum. The film coated with the ceramic layer is then laminated to the other films, which may also have been printed, to give the film composite.

The coating process is controlled by way of the vaporization rate of the material to be vaporized, the deposition rate on the substrate, and the exposure time of the substrate in the vacuum-chamber atmosphere, in such a way as to give the required layer thickness for the $SiO_x$ coating.

It is preferable to vaporize aluminum while applying oxygen, or silicon monoxide (SiO), optionally while supplying oxygen. The layer made from $SiO_x$ may be produced by plasma polymerization.

The film composite of the invention is particularly suitable for producing flexible packaging, such as film bags, or else as lid material for sealing onto containers. One particularly preferred application sector consists in the use of the film composite of the invention for the packaging of foodstuffs or other consumable items which, after packaging, are sterilized in the water bath or in water vapor at temperatures of more than 90° C.

The film composite of the invention is also suitable as a barrier material in the engineering or medical sector.

What is claimed is:

1. A film composite for packaging purposes, effectively blocking the passage of water vapor and gases after sterilization in a water bath or in water vapor temperatures of more than 90° C., where the film composite has a barrier layer produced by vapor-deposition of inorganic materials, and wherein the film composite encompasses a film made from polyethylene terephthalate (PET) with a coextruded layer made from polyethylene 2,6-naphthalate (PEN) on at least one side, and has a ceramic layer of from 10 to 200 mm thickness on an outer surface of at least one of the sides coated with PEN, said ceramic layer being produced in a vacuum, where said ceramic layer is comprised of $Al_2O_3$ or $SiO_x$, x being a number between 0.9 and 2.

2. The film composite as claimed in claim 1, wherein the thickness of the PEN layer is from 0.1 to 4 μm.

3. The film composite as claimed in claim 1 wherein the thickness of the ceramic layer made from $Al_2O_3$ or $SiO_x$ is from 40 to 150 nm.

4. A process for producing a film composite for packaging purposes, as claimed in claim 1, where the ceramic layer of the film composite is subsequently laminated to a second film producing a film composite having an overlayer on the ceramic layer.

5. The process as claimed in claim 1, wherein the ceramic layer of $Al_2O_3$ is formed by vacuum coating aluminum vaporized in the presence of oxygen.

6. The process as claimed in claim 1, wherein the ceramic layer of $SiO_x$ is produced by vacuum coating silicon monoxide vaporized in the presence of oxygen.

* * * * *